US008249743B2

(12) United States Patent
Pelletier

(10) Patent No.: US 8,249,743 B2
(45) Date of Patent: Aug. 21, 2012

(54) ARTICLE MANAGEMENT SYSTEM

(76) Inventor: Florent Pelletier, Grand Cayman (KY)

(*) Notice: Subject to any disclaimer, the term of this patent is extended or adjusted under 35 U.S.C. 154(b) by 603 days.

(21) Appl. No.: 12/513,544

(22) PCT Filed: Nov. 6, 2007

(86) PCT No.: PCT/CA2007/002079

§ 371 (c)(1), (2), (4) Date: May 5, 2009

(87) PCT Pub. No.: WO2008/055364

PCT Pub. Date: May 15, 2008

(65) Prior Publication Data

US 2010/0063621 A1 Mar. 11, 2010

Related U.S. Application Data

(60) Provisional application No. 60/864,455, filed on Nov. 6, 2006.

(51) Int. Cl.

*G06F 17/00* (2006.01)
*G06F 7/00* (2006.01)
*B65H 1/00* (2006.01)

(52) U.S. Cl. ........ 700/214; 700/243; 700/237; 700/236; 700/242; 221/120; 221/122

(58) Field of Classification Search ........................ None
See application file for complete search history.

(56) References Cited

U.S. PATENT DOCUMENTS

| | | | | | |
|---|---|---|---|---|---|
| 4,812,985 | A | * | 3/1989 | Hambrick et al. | 700/215 |
| 4,928,245 | A | * | 5/1990 | Moy et al. | 700/218 |
| 5,172,829 | A | | 12/1992 | Dellicker, Jr. | |
| 5,212,649 | A | * | 5/1993 | Pelletier et al. | 700/243 |
| 5,344,042 | A | | 9/1994 | Crosby et al. | |

(Continued)

FOREIGN PATENT DOCUMENTS

| | | |
|---|---|---|
| CA | 1263167 | 11/1989 |
| CA | 2257720 | 12/1997 |
| CA | 2324176 | 4/2001 |
| EP | 0703341 | 3/1996 |

OTHER PUBLICATIONS

PCT/CA2007/002079, International Preliminary Report on Patentability, and Written Opinion, 8 pages, May 22, 2009.
PCT/CA2007/002079, International Search Report, 5 pages, Feb. 29, 2008.

*Primary Examiner* — Gene Crawford
*Assistant Examiner* — Yolanda Jones
(74) *Attorney, Agent, or Firm* — Dennis R. Haszko

(57) ABSTRACT

An apparatus for controlling secure access and storage of at least two different types of articles is disclosed. The apparatus includes a plurality of compartments for articles, the compartments arranged in a rotatable cylindrical array with one opening for each compartment on the surface of the cylinder. A linearly driven belt having an access port thereon limits access to a single compartment. The compartments may be of equal or different size to accept different articles. A sliding door, positionable over an opening in the housing, provides additional security. A drawer with additional compartments may be included in the apparatus in addition to the cylindrical array. Certain compartments may have an assignment linking them to other compartments in the cylindrical array or drawer, allowing for the secure and separate storage of sets of related articles, such as the keys, registration and/or license plate of a car. Access to stored articles is achieved through a touch screen user interface, an OCR document reader or scanner, a biometric reader device, or any combination thereof. The apparatus provides easier and quicker access to stored articles, especially sets of stored articles.

20 Claims, 7 Drawing Sheets

U.S. PATENT DOCUMENTS

| | | | | |
|---|---|---|---|---|
| 5,801,628 | A | 9/1998 | Maloney | |
| 6,131,808 | A | 10/2000 | Pires et al. | |
| 6,195,005 | B1 | 2/2001 | Maloney | |
| 6,609,657 | B2 | 8/2003 | Pires | |
| 7,395,133 | B2 * | 7/2008 | Lowe | 700/218 |
| 7,854,332 | B1 * | 12/2010 | Clausen | 211/41.12 |

* cited by examiner ( CONTINUATION ON NEXT PAGE )

ARTICLE MANAGEMENT SYSTEM

FIELD OF THE INVENTION

The present invention relates to apparatus for storing and retrieving articles and to the management of articles and access thereto by users using secured compartment systems.

BACKGROUND OF THE INVENTION

The secure storage and controlled access to articles, such as keys is important in automobile dealerships, garages, hotels, rentals apartments, government agencies etc. In the case of automobile dealerships, the storing and safeguarding of license plates is also very important as in all situations where access to numbers of articles such as keys or other than keys having different sizes than keys must be restricted to particular persons or groups of persons and where it is important to know whether an article is in or out of storage. The acquisition of a customer's or user's personal information, or other types of information required to gain access to the articles, must also be quick, safe and accurate. The management of articles such as keys and license plates represents a serious problem in numerous businesses such as automobile dealerships. Often, a large number of vehicles, each having it's own individual key or keys, are present and several salesmen are employed who require access to the keys and or license plates of those vehicles. Certain salesmen may be allowed access to a limited number of the vehicles which they can access for sale or demonstration, while others may be permitted access to all vehicles except a chosen few high priced or specific vehicles to which only the manager or the owner of the establishment may have access. When a demonstration or a vehicle trial is desired, a dealer's license plate may be necessary to access public roads. Thus, controlled access to the assortment of dealer plates assigned to the establishment is also extremely important.

Typically all the keys of a dealership are merely hung up on a board, or placed in a system of envelopes, or in tag boxes. In some cases, the keys are simply left unorganized on desks etc. and the dealer plates are merely be piled loosely and unguarded on an open desk. This is dangerous, since unauthorized persons may gain access to keys and plates and use a vehicle without prior authorization and either damage or even misappropriate the vehicle.

Several attempts have been made to bring forth organizational systems for keys to rectify the problem of controlling access to multiple keys by multiple users of different authorization levels. Although the problem has somewhat been looked after as seen in the prior art, certain critical disadvantages are still inherent and troublesome. The adequacy of reporting, diagnostics, data archiving and data storage is still unacceptable in some prior art solutions.

The surface needed per article and the multitude of articles to be controlled poses a problem in flat surface cabinet type arrangements. This combines with the complex inter-wiring needed to accommodate several separate modules, each of which may be of a considerable size, to make this type of equipment of the prior art cumbersome and impractical for locations where the control of large quantities of articles is needed. U.S. Pat. Nos. 6,609,657 and 6,131,808 disclose such systems. The mechanical complexity and somewhat less than reliable mechanical means combined with the necessity for external add-on tagging, labeling or other identification methods, or packaging poses obvious complications and problems. U.S. Pat. Nos. 4,812,985 and 5,344,042 disclose such systems. In some prior apparatus designed for the use of controlling access to articles such as keys, unauthorized access to several articles not called for was possible. In other prior apparatus where articles such as keys are retained by rings or snaps retained by a locking mechanism, it was found possible to separate the keys from the retaining rings or snaps without authorization, making the reliability of the system dependent on the honesty of its users. U.S. Pat. Nos. 5,801,628 and 6,195,005 disclose such systems. In U.S. Pat. Nos. 6,195,005 and 5,801,628 an attempt was made to further guard against dishonest removal of articles not called for by using further, more complicated add-ons which in some cases further reduced the storage capacity of the apparatus, while not entirely ruling out the possibility of unauthorized access. In some apparatus described in the prior art, an attempt was made to guard license plate, but due to the flat plane design storing method it is obvious the available space for storing normally intended articles is seriously hindered and critically reduced.

One known system addresses many of the abovementioned weaknesses of the prior art apparatus is disclosed in my previous Patents Canadian Pat. No. 1,263,167 and U.S. Pat. No. 5,212,649.

The problem of proper storage and safeguarding of articles other than keys, for example license plates, in one and the same apparatus however remains. Also, the need for repeated acquisition of user identification data through manual input interfaces makes user access somewhat lengthy, complicated and at times inaccurate or possibly incomplete due to language or dexterity limitations. For example, significant time is wasted in car dealerships with secured storage key cabinets by the users having to type in access data on a keyboard each time a key is to be removed from or replaced in the cabinet. Storing keys and license plates of cars in separate locations further slows down access to the desired vehicle. Speed of access and simplicity of operation are challenges, which have still not been satisfactorily addressed in prior art apparatus.

Accordingly, an improved article storage system is desired which allows for the secure storage and retrieval of different types of articles. A system is also desired which would simplify and speed up repeat access to stored articles.

SUMMARY OF THE INVENTION

It is an object of the invention to provide an article storage and retrieval system which overcomes at least one of the disadvantages in prior art systems.

It is a further object of the invention to provide a system for the storage and retrieval of at least two different types of articles under controlled and secure access, for example car keys and license plates.

It is another object of the invention to provide an apparatus that is simpler to use and in which repeated access to articles and redeposit thereof into storage is quickly achieved with a minimum of involved time of the person concerned.

It is still a further object of the invention to provide an apparatus wherein access to stored articles is possible through user identification by way of a drivers license or a biometric feature.

It is yet another object of the invention to provide an apparatus to facilitate the ever increasing need of data collection and management. In a preferred embodiment, the apparatus of the invention therefore includes a drivers license reader and a secure login biometric recognition device.

It is still a further object of the invention to provide world wide remote access to the apparatus.

For simplicity and speed of usage, an apparatus in accordance with the invention preferably includes a touch screen access peripheral, thereby eliminating the need for an external keyboard. The apparatus preferably further includes a CPU and a WINDOWS based computer driven driver board for improved speed and effectiveness. Reporting, diagnostics and integration functions are preferably provided by the software implemented in the central control of the apparatus.

Another object of the invention is to maintain guarded and restricted access to different objects one at a time.

Yet another object of this invention to provide an apparatus which can store and manage articles of other utility and size than keys.

It is a further object of the invention to provide an apparatus with the ability to electronically acquire, arrange, and store in privacy and in expedient fashion personal information of customers.

It is yet another object of the invention to provide an apparatus of multiple utilities usage which is all incorporated under one single embodiment and totally self contained, with a central computer locked and guarded within a secure cabinet, offering the utmost security and yet taking minimal and reasonable space while offering the utmost capacities of fulfilling the intended uses and users needs.

Still another object of the invention to provide an apparatus which does not necessitate any add-ons, coding, labeling, markings or external packaging to articles being stored and controlled.

A further object of this invention to provide an apparatus that is compatible with all the latest computer industry windows technologies and peripherals, is networkable and web systems accessible.

Another object of the invention is to provide an apparatus which is integratable to Dealer Management Systems "DMS" and Manufacturers Inventory Management Softwares "IDMS".

Yet another object of the invention is to provide an apparatus with a proprietary CPU control board of industrial grade driven by combined machine language and proprietary software "Keygo" adapted to WINDOWS based programs for ease of future upgrading.

It is yet a further object of the invention to provide an apparatus which is totally self contained and which offers self diagnostics and troubleshooting features both accessible securely locally and remotely.

Finally other objects and advantages concerning the improvements and subject to the invention will be in part obvious and apparent from the specifications and drawings.

BRIEF DESCRIPTION OF THE DRAWINGS

Reference will now be made, by way of example, to the accompanying drawings.

DETAILED DESCRIPTION OF EXAMPLE EMBODIMENTS

Figure 1:
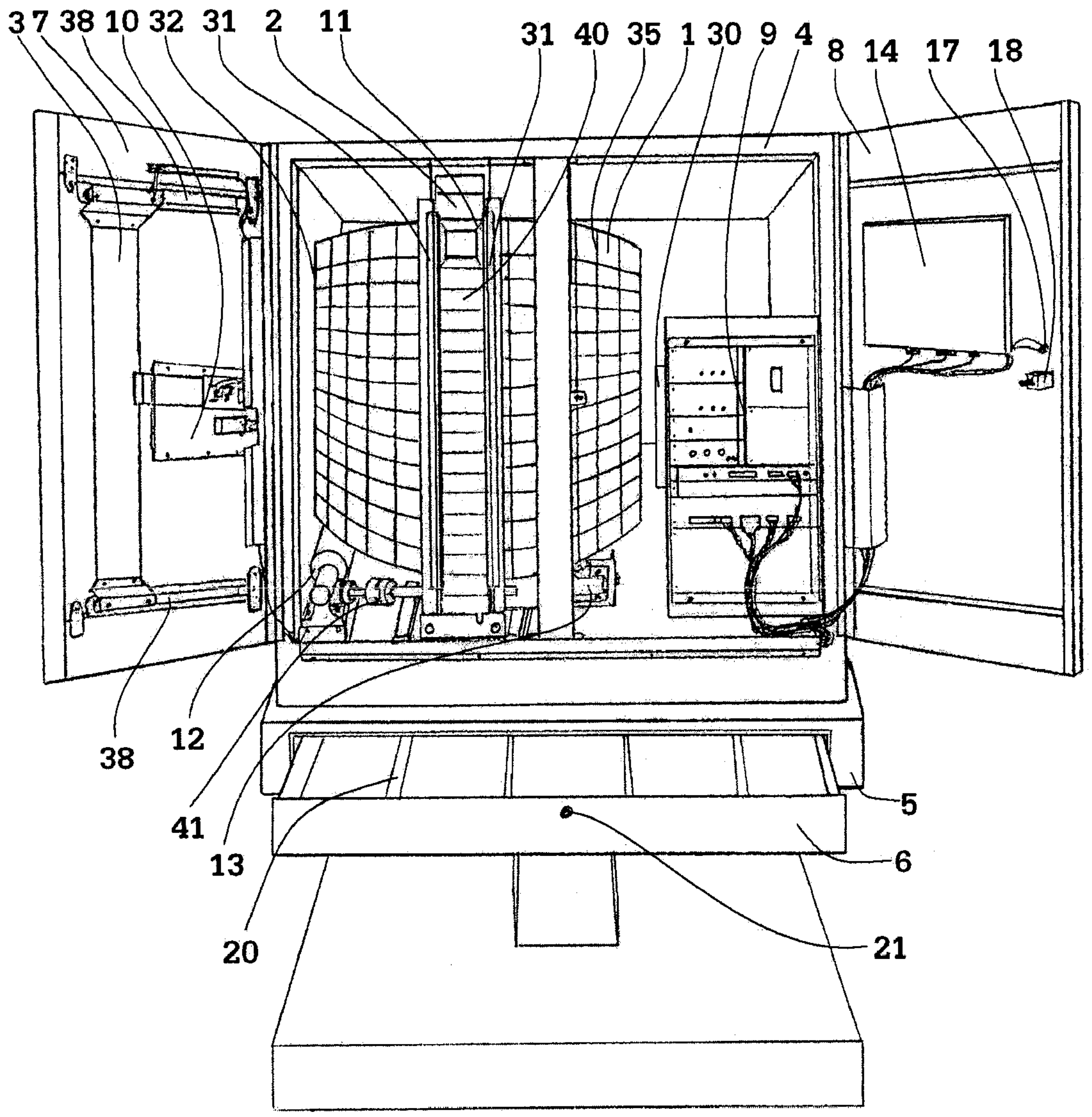
FIG. 1 is a front perspective view of the article management system in accordance with the invention with both front access doors open.

A preferred embodiment of an article storage and retrieval system in accordance with the invention is shown in FIG. 1. In the illustrated embodiment, the apparatus includes a cabinet 4, preferably supported on a pedestal 5, which cabinet encloses the basic components of the apparatus, a drawer 6, preferably with parallel compartments 20 further described in detail below with reference to FIG. 3, a cylindrical array 32 of article storage compartments 35, preferably arranged in an assembly of vertically stacked layers of circularly arranged compartments, an access control belt 2 and sliding door 3, which together restrict access to one compartment 35 at a time with or without simultaneous access to the drawer 6, and a control system 9 (embodied in an "electronic rack" or "electronic rack system" as shown and interchangeably described herein) for user identification and operation of the access control mechanism.

Figure 3:
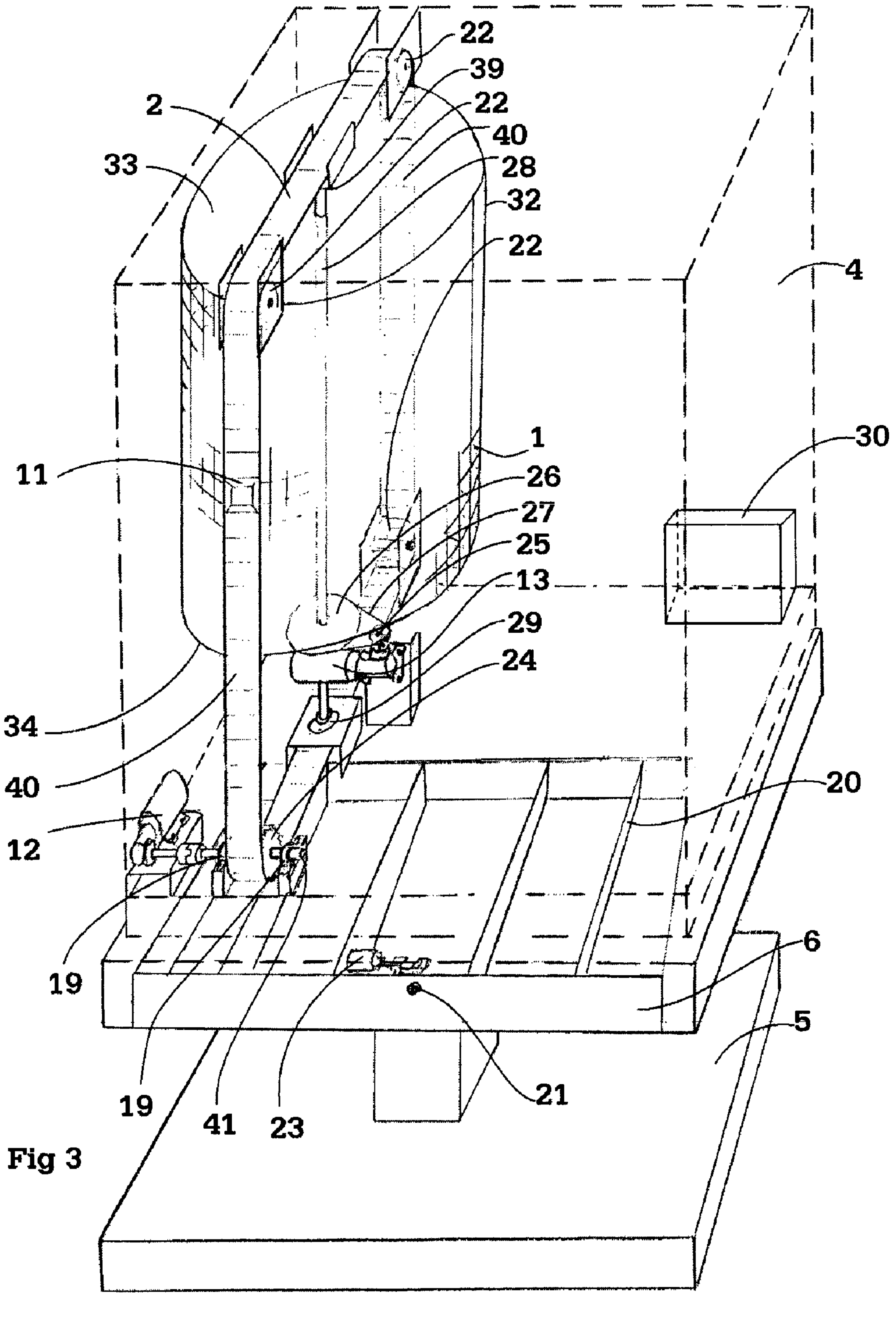
FIG. 3 is a phantom view illustration of the internal components of the system.

The cylindrical array 32 includes a supporting framework 34 and 33 as shown in FIG. 3. The framework is carried on a vertical shaft 28 rotatably supported in top and bottom bearing units 39 and 29 mounted to the cabinet 4. In the cylindrical array 32, each compartment 35 is interlocked with at least one other compartment 35 and is open at its radially outer end for user access. A sprocket 26 on shaft 28 is driven by a motor 13, preferably a step or servo motor, through a chain 27. The motor 13 is operated by a micro processor embedded in an electronic control unit, preferably a controller board in an electronic rack system 9, under the control of a central processing unit 30. Thus, the cylindrical array 32 is rotated by activation of the motor 13.

Arranged in a vertical plane about the compartment assembly 32 is an access port mechanism consisting of a continuous flexible belt 2 comprised of inflexible durable plate links 40 hinged to one another, and carried on two upper and one back lower idler sprockets 22 and one bottom front driving sprocket 24 mounted in cabinet 4. The front part of the belt system between driving sprocket 24 and top front idler sprocket 22 is supported and reinforced by track slides 31 on each vertical side. In each slide, the belt is embraced by back and front supports which limit movement towards and away from the cylindrical array 32, but permit free vertical movement up or down of the belt. The continuous belt 2 includes an access link forming an access port 11 from one end to the other of the plate links 40. The belt can be advanced or reversed in the track slides 31 by belt drive motor 12, preferably a step or servo motor. The belt drive motor 12 is connected to driving sprocket 24 by shaft 41 and controlled by microprocessor command of central control unit 30 and control electronics 9.

The part of the belt 2 which runs parallel to the front face of the cabinet 4 is positioned directly behind a sliding door 3 which in turn is supported on tracks 38 mounted on service door 7 of cabinet 4. Sliding door 3 is parallel to and directly behind a vertical slot opening 16 in service door 7, which opening is at least the length of the longitudinal axis of the cylindrical array 32. Access to a selected compartment 35 is achieved by aligning access port 11 with the selected compartment through advancement, or reversal of the belt 2 by drive motor 12. In order to reduce the time required for adjustment of the belt position, the belt 2 can include two or more access ports 11 which are sufficiently spaced apart along the belt to avoid more than one access port 11 being aligned with the slot opening 16.

In use, the service doors 7 and 8 are closed and locked by a locking device 18. Access into the cabinet 4 is only possible if sliding door 3 is open, and the access port 11 is placed within the slot opening 16. The remainder of slot opening 16 (see FIG. 2) will be blocked by the solid plate links 40 of which belt 2 is composed.

It will now be clear that by appropriate rotation of the cylindrical array 32 by means of motor 13, access to any one of the compartments, but only one at a time, can be achieved at the slot opening 16. By changing the vertical position of the access port 11 by movement of the belt system driven by motor 12, all of the compartments at each level of the cylindrical array 32 can be one at a time, while all other compartments located within the slot opening 16 are guarded from unauthorized access. It will also be clear that final access to any compartments is only achievable after the sliding door 3 located behind slot 16 (illustrated in FIG. 2) is in the fully open position.

Final access to each compartment is only possible after access port 11 is positioned in front of the selected compartment and the sliding door 3 is activated by controlling means 30 and 9 and moved to the open position by mechanical means 10. When the transaction is completed, the central processing unit 30 displays a prompt on a screen 14 (best seen in FIG. 2). The prompt asks the user to indicate completion of the transaction, upon which the sliding door 3 closes. If no action is taken in reaction to the prompt, an automatic timeout feature in the control electronics activates closure of the sliding door.

Figure 2:
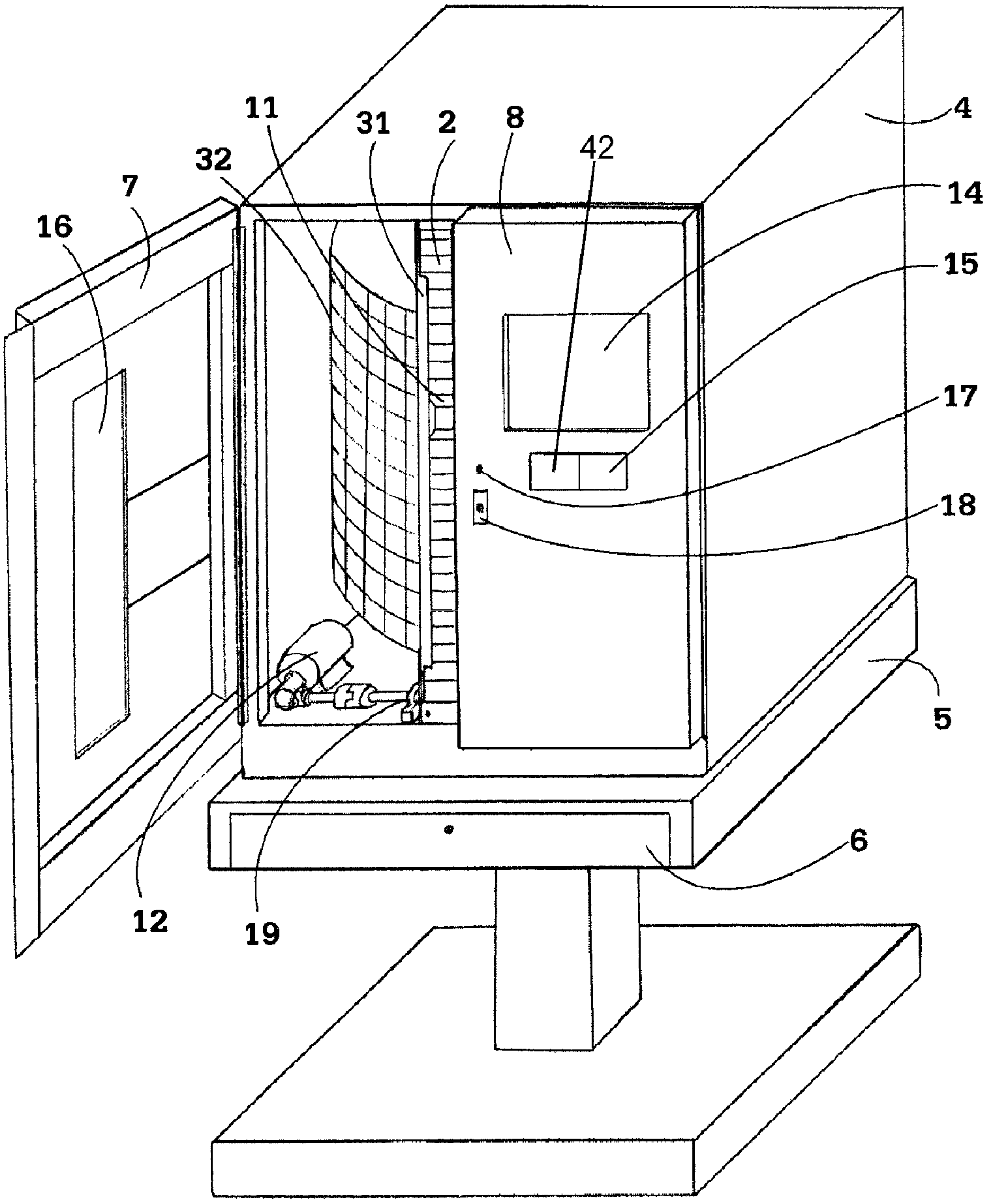
FIG. 2 is a front perspective view of the system with only one access door open.

In FIG. 2, the cabinet enclosure 4 which is attached to and part of the pedestal 5 is illustrated with door 7 shown in the open position, whereby the slot opening 16 is seen from the inside, while door 8 is shown in the closed position. Illustrated on door 8 are an access and display touch screen 14, a data acquisition OCR device 15, a biometric device 42 and a bulk load/unload bypass 17. The service access doors 7, 8 of the cabinet 4 are held closed by a main lock 18.

FIG. 2 shows the pedestal enclosure 5 of the apparatus and the drawer 6 in the closed position, while the drawer is shown in a partially open position in FIG. 1, showing compartments 20. FIG. 3 shows the drawer in the closed position but in phantom view and showing the locking solenoid mechanism 23 and view of the compartments 20.

In FIG. 3, the apparatus of an exemplary embodiment is shown in a perspective phantom view showing the internal components but excluding for added clarity the service access doors 7 and 8 otherwise shown in FIGS. 1 and 2. Also excluded are the support backing tracks 31 and the electronic rack system 9 better seen in FIG. 1. The main CPU 30 is better represented in this FIG. 3 as it is partially obstructed in FIG. 1 by the electronic rack system 9.

FIG. 3 shows all internal mechanisms for both the cylindrical array 32 and the access port belt system 2. It also shows their respective driving mechanism items 12, 19, 41, 24, 22 for the access port belt system and items 13, 26, 27, 28 29, 39 for the cylindrical array compartments system. Further, it shows clearly the locking access mechanism 23 and 21 of the drawer compartments. The access to compartments 20 is on command from micro processor embedded controller board in electronic rack 9 and further controlled by CPU 30. Item 1 represent the outer face of one unit component 35 showing the opening on the cylindrical array of compartments and is best represented in FIG. 4, later described.

Figure 4:
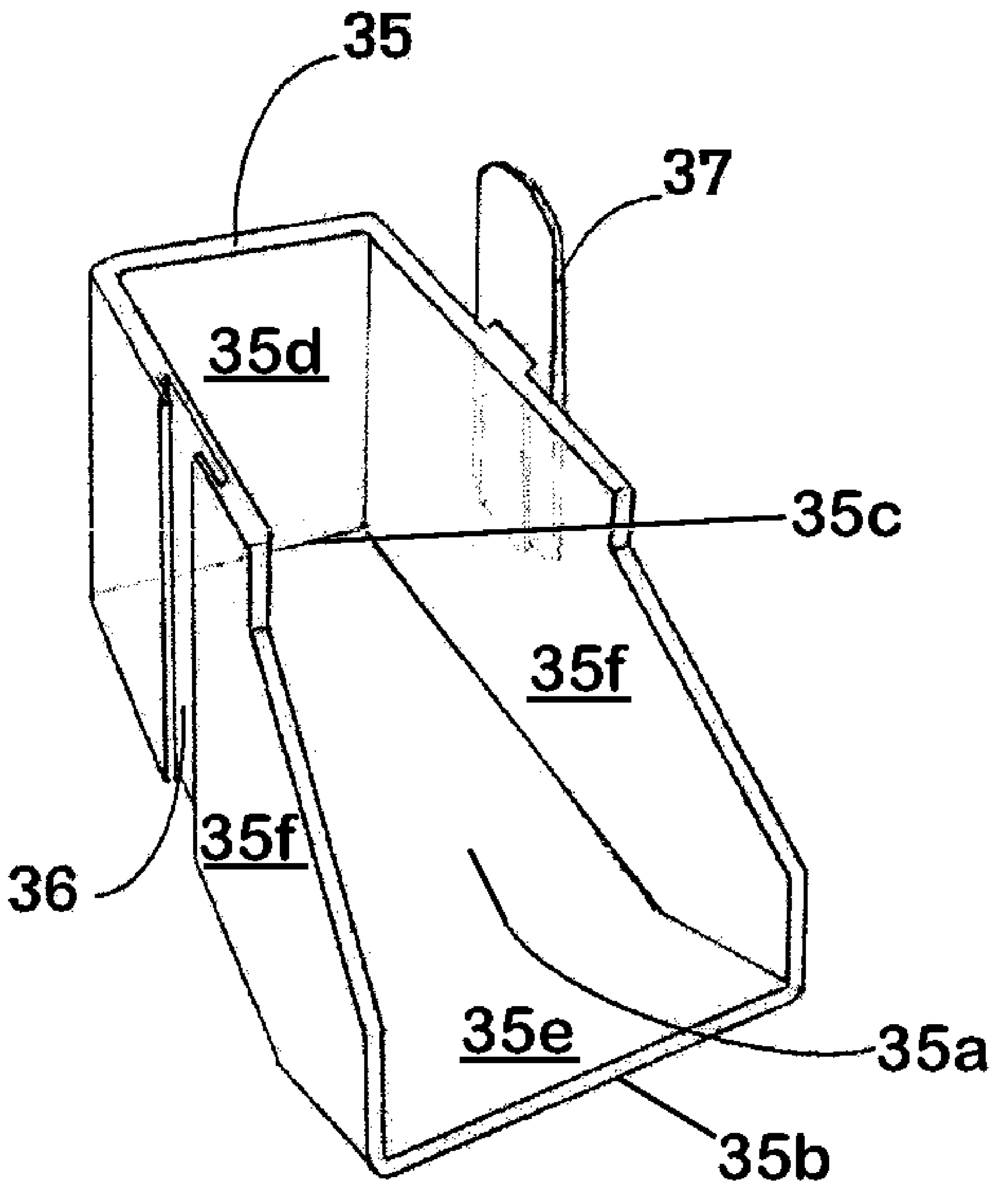
FIG. 4 is a perspective view of a unit compartment of the cylindrical array of compartments as shown in FIGS. 1 to 3.

FIG. 4 illustrates a unit compartment 35 of the cylindrical array 32 as shown in FIGS. 1, 2 and 3. All compartments of the cylindrical array have the same principle construction and include a bottom or base 35*a* in the shape of an equilateral trapezoid with a front edge 35*b* being shorter than the rear edge 35*c*. Upstanding rear, front and side walls 35*d*, 35*e* and 35*f* respectively define an upwardly open compartment together with the base 35*a*. One of the side walls 35*f* includes a groove (or alternatively referred to as "slide") 36 and the other side wall includes an interlocking tab 37. The groove 36 and the tab 37 are oriented at a right angle to the base 35*a* to permit sliding interengagement in the vertical direction. It will be readily clear from this drawing view represented in FIG. 4 that the interlocking tab 37 will mate in the groove 36 of an adjacent unit compartment 35. It is readily apparent that successive placement of multiple compartments 35 in a row will result in a circular array of compartments, due to the trapezoid base 35*a*. It will also be clear that portions of tabs 37 from a lower or higher circular arrays of compartments would mate with the bottom portion of slides 36 of another cylindrical array of compartments placed directly above it, thereby interlocking the individual compartments 35 with one another not only in an adjacent side by side placement, but also between circular arrays. This allows the use of compartments 35 of different height together in the same cylindrical array 32, making the apparatus of the invention much more versatile than prior art apparatus with compartments of only a single size. For example, if the compartments are selected to be at least as high as a license plate, both keys and plates can be stored in an apparatus in accordance with the invention. It is also possible to store vehicle papers, such as insurance and registration documents, in separate compartments of equal or different size. Thus, the apparatus of the invention is much more versatile than prior art apparatus and allows for the secure storage and retrieval of many different objects separately or in combination.

Especially when the height of the compartments is selected to be a base height H or multiples thereof (H, 2H, 3H . . . ), is it possible to still arrange all compartments 35 in a cylindrical array 32 with fixed overall height and planar top and bottom surfaces. The compartments 35 in each circular array can be selected to be of the same height, but compartments 35 of different height can also be placed in the same circular array. For example, one or more vertical stacks of two compartments 35 of height H can be combined in the same circular array with compartments of height 2H. Since all compartments include the same base 35*a*, the diameter of the circular arrays is constant, irrespective of the size of the compartments and only the height of each circular array is dependent on the height of the compartments 35 respectively used. Of course, the lateral size of a compartment can also be a multiple of the width of the base 35*a*, making it possible to increase the storage capacity of a compartment without increasing its height. Therefore, even the use of compartments of different height will always result in a cylindrical array 32. It will also be clear that stacking circular array upon array will form a cylindrical array 32 having an opening 1 for each individual compartment 35 on the outer face of the cylindrical array 32. It is further apparent that the size of the access opening to each compartment is limited by the size of the access port 11 in the belt 2. Thus, if compartments of multiple height are used (height=XH, with X being an integer larger than 1), the belt 2 should include a separate access port 11 for each compartment height used. Also, if compartments of multiple width are used, it may be necessary to adjust the width of belt 2 to the largest compartment width used.

The apparatus includes the electronic control unit 30, which communicates with a user interface in the form of the touch sensitive display screen 14, the data acquisition OCR device 15, the biometric device 42 and the bulk load/unload bypass 17. The control unit 30 is preferably in the form of a CPU, for example running a WINDOWS type operating system.

Figure 5:
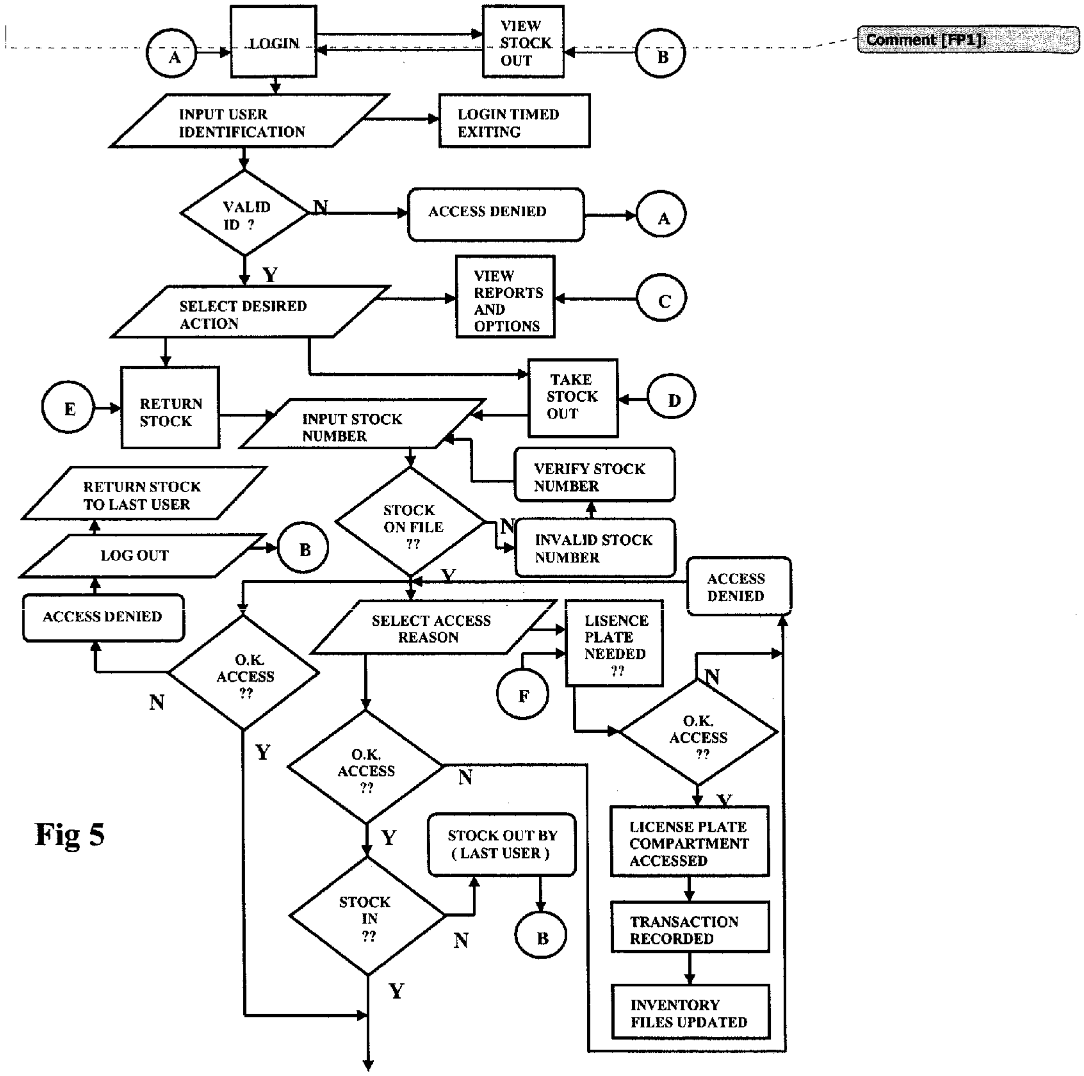
FIGS. 5 and 6 illustrate a simplified flow chart of a program controlling access to the apparatus of the present invention.
Figure 6:
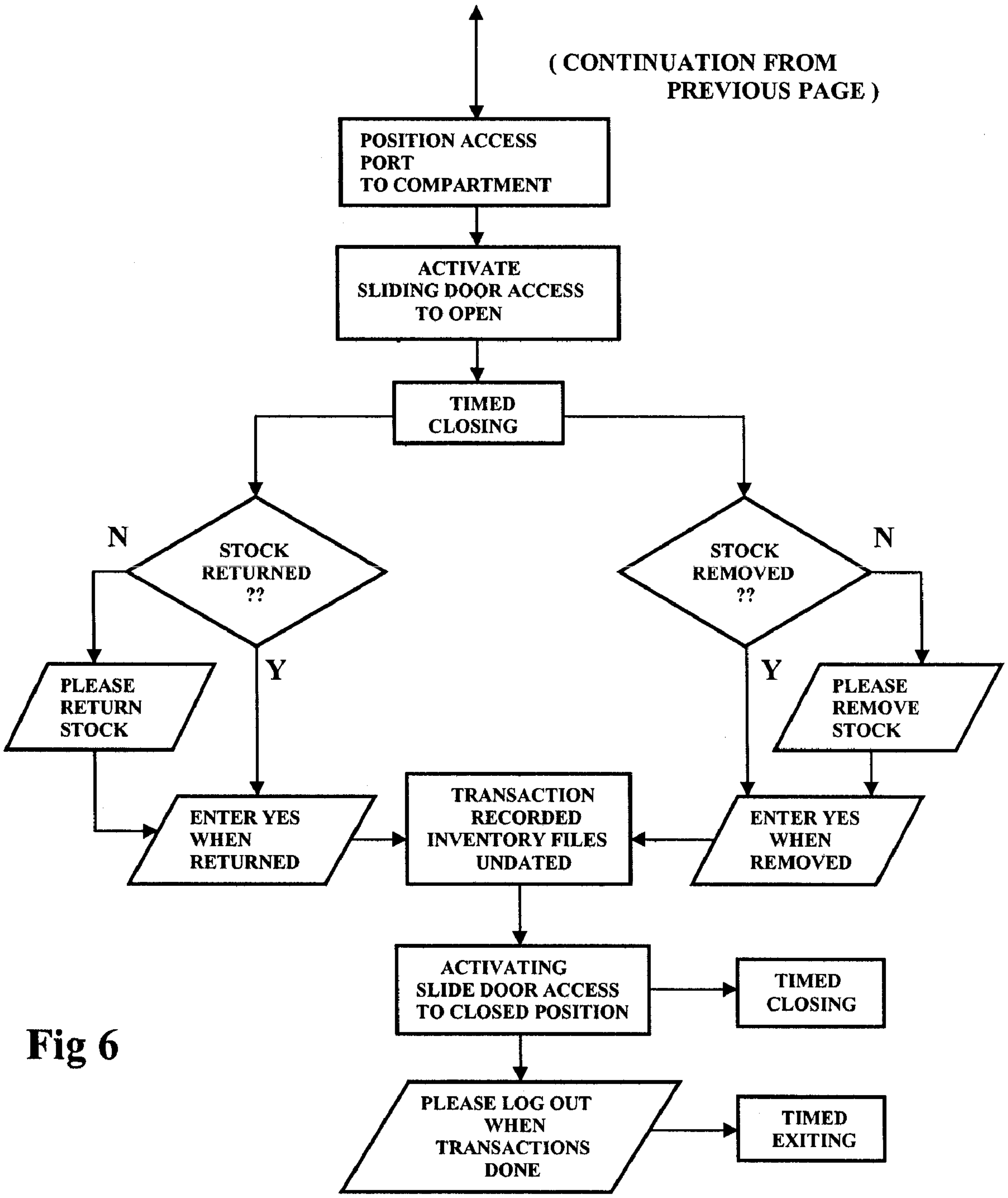

FIGS. 5 and 6 illustrate a simplified flow chart of an exemplary program for controlling access to an apparatus in accordance with the present invention. It provides access to views of accessed stock currently taken out and by which user. To gain further access, an authorized user must first login. If the login identification does not compare to a registered authorized identification, access is denied. Various levels of access are programmed and different menus are displayed depending on a user's level of access. Reports and various stored articles may be restricted to certain levels of access. If a user's identification is valid then the user is prompted to enter the identification of the article of interest and which action is desired (removal or replacement of an article, storing or editing article information). When access to or return of articles guarded by and registered within the apparatus is the action selected, the program compares the user's stored level of access with the access level required for the selected article. If the user's access level is not sufficient for access to the selected article, the user's request is denied. If it is valid, the process continues.

The program also inspects the inventory record files to determine if the article sought is a registered article within the apparatus' stock identification system. If the article is not found, an "invalid stock number" message is displayed. If found, the program determines the status of the article and continues the process. If the desired action was "return" and access was denied user is prompted to log out and return stock to the last authorized user stored in an access history memory. If the return action was accepted, the process continues (see FIG. 6). If the desired action was "remove" then, the user is requested to select a reason for access, the program then inspects the user's access level, assignment and restrictions and compares it to the level, assignment, restrictions and reasons of the article sought. If the records compare, processing continues, if not, access is denied. If the article is found and action requested was "remove" but the article status shows it not in its assigned compartment, then the out of stock status is displayed, the last user is determined from the transaction history and the identity of the last user is displayed. If the article is found and action requested is "remove" and status indicates "stock in" then the process continues. An action button is displayed on screen 14 for license plate access. If the button is activated, the user's access level is verified and, if access is denied then the user is returned to select a reason for access. If access to the license plate compartment is allowed the transaction is recorded in the transaction history memory and the inventory files are updated.

As apparent from the flow chart of FIG. 6, once the first part of the access control process is completed, access to the compartment assigned to the selected/requested article may be given and a prompt of "please remove stock" or "please return stock" is displayed followed by a prompt of "enter yes when removed" or "enter yes when returned". The transaction history and inventory files are then updated and a prompt of "please logout when transaction completed" is displayed. If log out is not performed within a preset amount of time, a timed feature will automatically logout the user.

Figure 7:
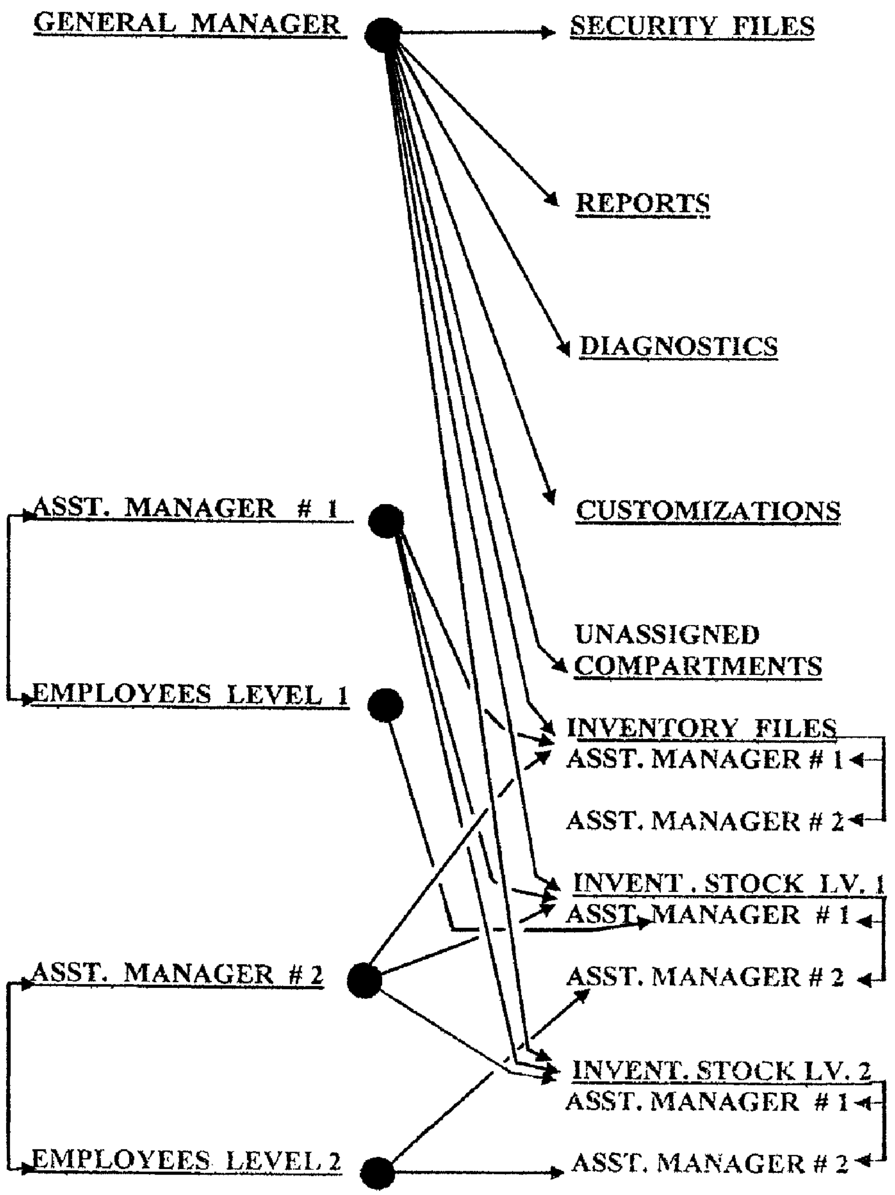
FIG. 7 illustrates schematically an organizational hierarchy predefined in the control program of the apparatus.

FIG. 7, illustrates schematically the organizational hierarchy predefined in the control program of the apparatus. Access privileges, as defined in inventory files are assigned and controlled by the General Manager.

Only the General Manager can access and change the control of security files which define the access privileges to the inventory file records. Each inventory file which corresponds to one compartment in the compartment array contains a field to store the identification code of the Assistant Manager responsible for the contents (stock) of that compartment. This Assistant Manager may access any compartment inventory record file assigned to his responsibility to change the contents of the compartment or the identification code of the contents of the compartment. However, he may not access inventory files, which are not assigned to his responsibility. Employees may only access the contents of the compartments (stock) for which they are permitted access. Certain employees may have access to contents (stock) assigned to more than one Assistant Manager while others may have only access to stock assigned to their immediate Assistant Manager. Only the General Manager can generally access and customize all files.

User identification is generally done in prior art apparatus by way of a keyboard interface. However, this is time consuming and can be quite frustrating, especially for users with marginal typing skills. In the preferred embodiment of the apparatus of the invention, the initial input of user identification data and setup of user files is carried out by way of the touch sensitive screen 14. For security reasons, this can only be done by a user with a high level of clearance or access, typically the General Manager. User identification subsequent to the initial setup is then carried out by way of a personal identification document, such as a driver's license or a biometric feature, such as a fingerprint. The personal identification document is scanned by way of the data acquisition OCR device 15, preferably a driver's license reader/scanner, and the biometric feature is captured by the biometric device 42, preferably a fingerprint reader. The associated data are stored during user setup. During user access, the stored data are compared to those input by the user. Thus, user access is much facilitated and sped up by the user simply scanning his driver's license on the scanner 15, or holding his index finger on the biometric device, or both. Interactions with the control electronics 30 of the apparatus are then carried out via the touch sensitive screen. To further improve the user interface, a list of all articles input into the inventory files can be displayed on the display to avoid the user having to type in any article identification numbers, or the like, for selection of the desired article. Most preferably, the user interface is designed to avoid the user having to type in any information.

The contents of the enclosure and, thus, the compartments 35 can be removed by way of a key operated bulk load/unload bypass 17, which allows the holder of a master access key to open the doors 7 and 8 of the enclosure to access multiple or all compartments 35 simultaneously.

Preferably, the control program illustrated in FIG. 5, FIG. 6 and by hierarchical importance described in FIG. 7, will perform the following steps when ready to permit access to an article in a compartment, access to an article in a second compartment, access to the drawer 6, or any combination thereof.

It first finds the current position of the column of compartments aligned with the access port 11 of the belt system 2 from the memory of the central processing unit 30 and control system 9, finds the current row (vertical level) of access port 11, finds the column and row of the desired compartment from a table stored in a non volatile memory of the central processing unit 30, computes the shortest route to reach the column of the desired compartment, selects the appropriate direction of rotation for the cylindrical array 32, computes the row difference for the desired compartment and determines the direction of movement for the belt system 2, sends appropriate electrical signals simultaneously to both respective motor drives 12 and 13 so to reach the desired X, Y coordinate and thus the desired compartment the quickest and most efficient way, activates the final access sliding door 3 for movement to the open position for access to compartment desired, determines whether the desired compartment is associated with a second compartment of the cylindrical array 32 or a drawer compartment 20 is required as well, identifies the location of the second compartment and operates as described above to provide access to the second compartment or provides access to the drawer compartment by operating the drawer lock solenoid 23, if required, to allow access to the drawer 6, records transactions and updates status and inventory files, and returns the apparatus to the ready to access condition in which the access sliding door 3 is closed. The central processing unit 30 is built and equipped to generate reports and diagnostics accessible, usable and printable anytime locally. Preferably, the central processing unit 30 also includes the required hardware and software for remote access to the unit via a computer network system or wirelessly. Yet it provides for controlled and guarded access of other articles stored within in drawer compartments arrangement system 20.

The present invention, is well adapted to carry out the objects, improvements and advantages mentioned. While preferred embodiments of the invention have been set out for purposes of disclosure, numerous changes in the details of construction and arrangement of parts and steps of the method will readily suggest themselves to those skilled in the art and which are encompassed within the spirit of the invention and the scope of the following claims.

The invention claimed is:

1. An apparatus for receiving, storing, safeguarding, managing and retrieval of articles, comprising:

multiple individual storage compartments for holding articles, said individual storage compartments for said articles being arranged in a cylindrical array having a cylindrical exterior surface rotatable about a central axis of said cylindrical array, a separate exterior surface opening in said cylindrical array to each individual compartment;

a means for allowing access to such compartments one at a time and to articles stored therein and physically restricting access and view to all other articles not selected;

a means for returning such articles to the same compartments for again storing them therein;

an enclosure having front doors, said enclosure surrounding said cylindrical array of storage compartment;

a movable access port in said enclosure which upon alignment with a selected one of said storage compartments in said cylindrical array permits access to the selected compartment;

a longitudinally extending slot in said enclosure door with at least a component sliding door of the length thereof and parallel to said central axis;

a set of channel tracks mounted horizontally and parallel to each other and to said enclosure door at opposite top and bottom parts of said enclosure door at longitudinal extremities of said sliding door wherein on said channel tracks said sliding door rides horizontally in a vertical and parallel position to said central axis;

a means for opening and closing said sliding door;

a belt received in said channel tracks and comprising a series of contiguous transversely extending plate links, wherein at least one of said plate links is apertured to define an opening in said belt that is the size of the said exterior opening of one of said storage compartments, wherein the other plate links forming said belt extending on either side of said opening is unapertured and prevents access through said belt except through said opening, said opening forming said moveable access port, said channel tracks are mounted parallel to the central axis and in front of said cylindrical array inside of said enclosure from top to bottom of said enclosure and movably retaining said belt in said channel tracks contiguous with an interior surface of said enclosure;

a positioning means for moving said belt vertically with respect to said cylindrical array wherein at least one component of movement is parallel to the horizontal arrays;

positioning means for rotation movement of said cylindrical array about an axis with respect to the enclosure, wherein at least one component of movement with respect to said movable access port provides access to each individual compartments respectively;

actuating means for said positioning means and said moving means, wherein each said article is assigned a value corresponding to one of said storage compartments;

an access means for controlling said actuating means in accordance with said selected assigned values;

a controlling means for controlling the access means;

a means for gathering, storing and organizing data;

a means to self diagnose functions and generate reports;

a means for guarding special stored articles;

a means for data entry and function or options display; and a means for controlling login access.

2. The apparatus as defined in claim 1, further including a pedestal for supporting the enclosure and being part thereof, said pedestal including at least one drawer comprising a plurality of individual compartments for storing said special stored articles, such as license plates but not limited thereto, and means for allowing controlled access to such said special stored articles guarded in locked compartments.

3. The apparatus as defined in claim 1, further comprising a means associated with said controlling means for changing assigned values.

4. The apparatus as defined in claim 1, further comprising a Touch Screen LCD display and access portal means connected to said controlling means.

5. The apparatus of claim 1, further comprising a key lock quick controlling mean bypass access for bulk load/unload of said stored articles.

6. The apparatus as defined in claim 5, further comprising a controlling means of access to key to said key lock quick controlling means.

7. The apparatus as defined in claim 1, comprising a customer data acquisitions system in the form of an OCR type document reader.

8. The apparatus as defined in claim 7, wherein said customer data acquisition system is connected to and controlled by said controlling means.

9. The apparatus as defined in claim 1, wherein said controlling means is constructed for recording transactions and customer data acquisitions from said apparatus for displaying, sorting and managing previous transactions data for each respective access attempt and wherein said controlling means is capable of guarding privacy of such customer data entries.

10. The apparatus as defined in claim 1, wherein said controlling means includes Ethernet and Web access capability.

11. The apparatus as defined in claim 1, wherein said controlling means comprising an embedded micro processor control driver board for controlling inputs and outputs for mechanical movements and data gathering and sorting for positioning process of said apparatus and said controlling means is connected to a WINDOWS supported central processing unit.

12. The apparatus as defined in claim 1, wherein said controlling means includes a means for determining position data of the array with respect of said access port, a means for receiving and storing said input data for access to a selected article, a means for comparing said input data and position data from said determining means, a means for operating said actuating means for said positioning means and said moving means to move said array to align the selected compartment with said access port utilizing minimum distances for effecting alignment and access to the storage compartment for said selected article, a means for operating said sliding door for final access for said selected storage compartment, means for accessing said unlocking means for bypass access bulk load/unload, a means to access said pedestal mounted special storage controlled accessed compartments, a means to collect and store data and produce reports and diagnostics, and a means to self troubleshoot and display diagnostics, actions and warnings.

13. The apparatus as defined in claim 1, wherein said controlling means further comprises a computer controlled means for displaying an occupancy status of each individual storage compartment.

14. The apparatus as defined in claim 1, wherein said previous transactions data is displayed only when said article for which access is attempted is not in its respective compartment.

15. The apparatus as defined in claim 1, wherein said previous customer data from said customer data acquisitions is readily accessible from said touch screen LCD display access portal means.

16. The apparatus as defined in claim 1, wherein each compartment includes a base in the shape of an equilateral trapezoid with front and rear edges, wherein the front edge is shorter than the rear edge, and an upstanding rear, front and side walls connected to a perimeter of the base for defining an upwardly open compartment together with the base, one of the side walls includes a groove and the other side wall includes a complementary interlocking tab for sliding engagement with a like groove of another compartment, wherein the groove and tab is oriented at a right angle to the base to permit sliding interengagement in the vertical direction for connecting adjacent compartments.

17. The apparatus of claim 16, wherein the compartments are interconnected successively to form a circular array which forms a row of compartments in the cylindrical array.

18. The apparatus of claim 17, wherein multiple circular arrays are stacked one on top of the other to form the cylindrical array, and whereby portions of the tabs from a lower or higher circular array of compartments mate with a portion of the grooves of another circular array of compartments, thereby interlocking the individual compartments with one another not only in a side by side manner, but also between circular arrays.

19. The apparatus of claim 18, wherein the compartments in a circular array are of different height, the height of each compartment is either a base height H or a multiple thereof.

20. The apparatus of claim 19, wherein the compartments in a circular array are of different width, the width of each compartment is either a base width W or a multiple thereof.

* * * * *